United States Patent [19]
Ballingal et al.

[11] Patent Number: 5,155,348
[45] Date of Patent: Oct. 13, 1992

[54] READ-OUT CIRCUIT FOR A PHOTODETECTOR

[75] Inventors: Ronald A. Ballingal; Ian D. Blenkinsop, both of Worcester, England

[73] Assignee: The Secretary of State for Defence in Her Britannic Majesty's Government of the United Kingdom of Great Britain and Northern Ireland, London, England

[21] Appl. No.: 663,890

[22] PCT Filed: Aug. 31, 1989

[86] PCT No.: PCT/GB89/01014
§ 371 Date: Mar. 19, 1991
§ 102(e) Date: Mar. 19, 1991

[87] PCT Pub. No.: WO90/03080
PCT Pub. Date: Mar. 22, 1990

[30] Foreign Application Priority Data

Sep. 7, 1988 [GB] United Kingdom ............... 8821037

[51] Int. Cl.$^5$ ........................................ H01L 27/146
[52] U.S. Cl. ................................. 250/208.1; 250/332
[58] Field of Search .............................. 250/332, 208.1

[56] References Cited

U.S. PATENT DOCUMENTS 4,771,175 9/1988 Sirieix et al. .................... 250/332

FOREIGN PATENT DOCUMENTS 0019269 11/1980 European Pat. Off.
0052024 5/1982 European Pat. Off.

OTHER PUBLICATIONS

Patent Abstract of Japan, vol. 5, No. 186 (E-84)(858), Nov. 25, 1981; JP, A, 56-111382 (Hitachi) Sep. 3, 1981.

Primary Examiner—Constantine Hannaher
Attorney, Agent, or Firm—Nixon & Vanderhye

[57] ABSTRACT

A read-out circuit for a photodetector incorporates a photodiode detector (1) connected via a preamplifier (2) to a storage capacitor ($C_5$). The capacitor ($C_5$) is also connected to a constant current circuit ($C_c$, $T_3$ to $T_7$) providing a correction current controlled by a voltage on a reference capacitor ($C_c$). The reference capacitor ($C_c$) is charged by the amplified photodiode output current during a calibration phase. During a measurement phase, the storage capacitor ($C_5$) integrates the difference between the amplified photodiode output current and the correction current. This provides pedestal signal substraction at the signal integration point. An array of photodetectors may be provided with a corresponding array of read-out circuits integrated in a single semiconductor substrate.

14 Claims, 1 Drawing Sheet

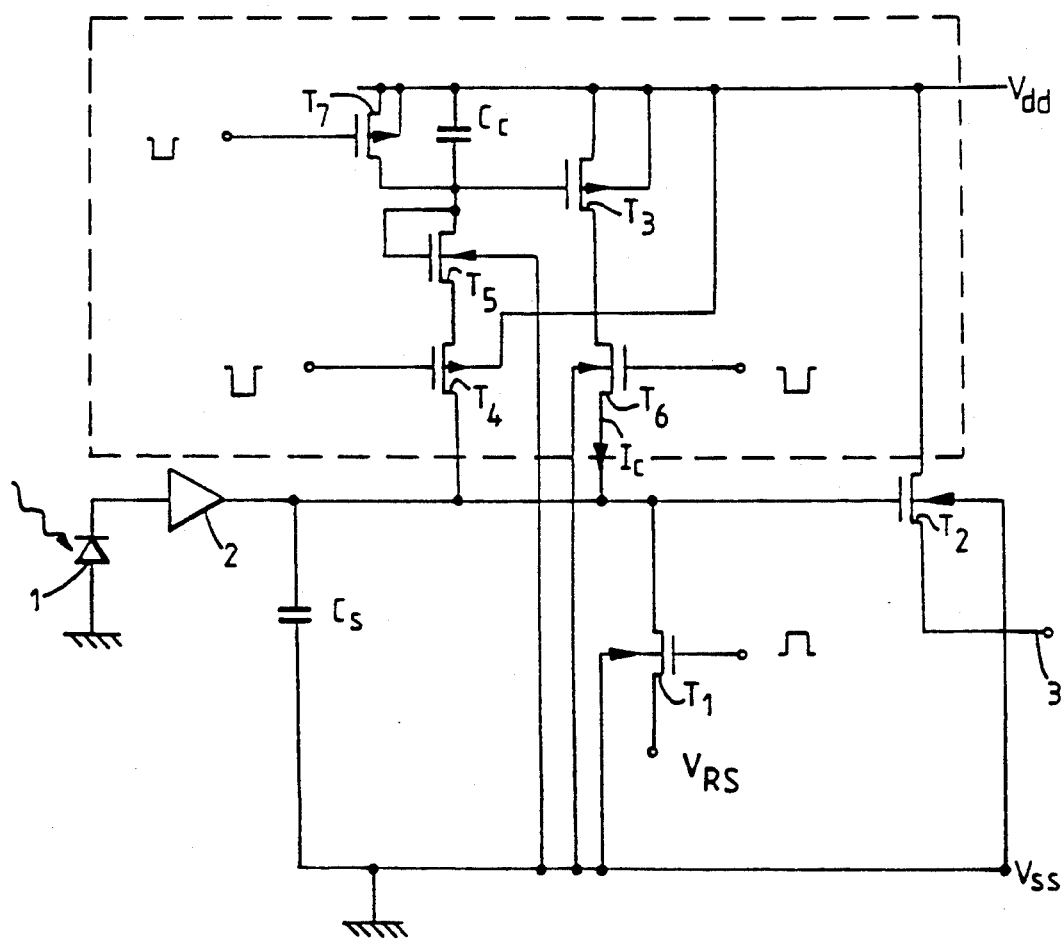

READ-OUT CIRCUIT FOR A PHOTODETECTOR

BACKGROUND OF THE INVENTION

1. Field of the Invention

This invention relates to a read-out circuit for a photodetector, and is particularly relevant to such circuits for use with focal plane photodetector arrays operating at infra-red (IR) wavelengths.

2. Discussion of Prior Art

Two dimensional IR photodetector arrays typically incorporate 128×128 photodiodes hybridised on to a silicon substrate measuring 6 mm×6 mm. Each photodiode responds to the integrated effect of respective incident photons by creating a charge of measurable magnitude which is converted to a current or voltage signal by electronic circuitry located on the same substrate. The signals from each photodiode are subsequently fed via a multiplexer to remote electronic circuitry for further processing.

Each photodiode of such an array has an associated MOS (metal-oxide-semiconductor) transistor, which transfers the photocharge from the respective photodiode to an associated precharged storage capacitor. The current flowing through each photodiode in response to incident IR radiation is then allowed to discharge its respective capacitor for a fixed time interval. The voltages remaining on the capacitors are then transferred via a multiplexer to remote signal processing circuitry. The capacitors are recharged and the process is repeated.

The output signal from a DC coupled IR detector array is normally composed of the wanted signal comprising the fine detail of the scene under surveillance superimposed upon a background "pedestal" signal. The pedestal can be a factor of one thousand or more larger than the wanted signal. It is likely to have a different value for each photodiode owing to, for example, variations in the cut-off wavelength. Photodiode arrays are normally operated under reverse diode bias. This results in a leakage current contribution to the photodiode output signal.

The presence of the unwanted pedestal and leakage signals imposes constraints and limitations on the design and performance of any detector array read-out circuitry. For example, the remote processing circuitry requires a large dynamic range (typically 12 bits) so that it may handle both the wanted signal and the unwanted pedestal. Also, since photocharge is integrated on the focal plane, a large fraction of the available storage capacity is used to store the pedestal charge, leaving less capacity for the wanted signal and thus degrading performance.

SUMMARY OF THE INVENTION

It is an object of the invention to provide an alternative form of photodetector read-out circuit usable with processing circuitry of reduced dynamic range compared to the prior art.

The present invention provides a read-out circuit for a photodetector, the circuit including correcting means arranged to derive a correction signal from the photodetector output during a calibration phase, and integrating means arranged to receive a measurement phase signal derived from the photodetector output during a measurement phase, characterised in that the integrating means is arranged to receive the measurement phase signal and the correction signal concurrently during the measurement phase and to integrate their difference.

The invention provides the advantage of reduction in dynamic range required of post-readout circuitry, by virtue of signal differencing prior to integration. This reduces the pedestal and leakage contribution to the integrated signal prior to transfer to remote circuitry.

The integrating means is preferably a storage capacitor chargeable to a preset voltage, and the photodetector and the correcting means are preferably arranged to give rise to respective signal currents in counterflow during measurement phase to produce a net current difference signal for integration by the storage capacitor.

The correcting means may be a constant current circuit which produces an output current under the control of the voltage on a reference capacitor. The reference capacitor is chargeable to an appropriate voltage in response to the photodetector output during the calibration phase.

A circuit in accordance with the invention may be applied to any combination of photodiode detector and preamplifier which is arranged to produce a current output. For example it may be used with a cadmium mercury telluride detector connected to an MOS transistor operated in common gate mode as a direct injection device.

Furthermore, application of the invention may be extended to linear and two-dimensional photodiode arrays. The invention may be implemented as an array of read-out circuits in complementary metal-oxide-silicon (CMOS) integrated circuit technology. Each read-out circuit may then be adjacent to or beneath the respective photodiode with which it is associated. Means may be provided for exposing the photodiodes to radiation from a defocussed or diffused image of a scene or from a substantially uniform source during the calibration phase.

Since the invention reduces the degree to which unwanted pedestal signal is integrated on the storage capacitor, it has the advantage of allowing the signal integration time to be increased. This results in improved sensitivity and a reduction in data processing rate.

BRIEF DESCRIPTION OF THE DRAWINGS

The invention will now be described, by way of example only, with reference to the drawing, which shows a read-out circuit for use with a photodetector in accordance with the invention.

DETAILED DISCUSSION OF PREFERRED EMBODIMENTS

In the drawing, a photodiode 1 is shown connected to a preamplifier 2 which, in turn, is connected to a storage capacitor $C_S$. The photodiode 1 is one of many diodes (not shown) comprising a two-dimensional cadmium mercury telluride-silicon hybrid focal plane imaging array.

Means for momentarily applying a voltage of predetermined magnitude (typically 4 V) across the capacitor $C_S$ are provided by a CMOS FET (complementary MOS field effect transistor) $T_1$ and a power supply $V_{RS}$.

A second CMOS FET $T_2$ configured as a source follower senses the voltage across the capacitor $C_S$ and transfers this output signal to a multiplexer (not shown) via line 3.

The part of the circuit enclosed in dotted lines forms a constant current supply circuit. This comprises a capacitor $C_c$ and five further CMOS FETs $T_3$-$T_7$. (The power supplies for all the FETs are shown as $V_{dd}$ and $V_{ss}$). CMOS FETs are preferred because of their low gate leakage and high on:off resistance ratio.

The FET $T_3$ supplies a controllable current $I_c$ which flows in the opposite sense to that through the photodiode 1. The FETs $T_4$ and $T_5$ enable the current through $T_3$ to be made substantially equal to the sum of the unwanted pedestal signal and the leakage current comprising the photodiode and preamplifier output. $T_5$ provides a floating voltage source between the drain of $T_4$ and the gate of $T_3$. This ensures the maintenance of an adequate bias voltage across $T_3$. A further FET $T_6$ is included to allow the current $I_c$ to be switched off during any period in which no current flows through the photodiode. The FET $T_7$ allows $C_c$ to be discharged when necessary.

$T_1$, $T_4$, $T_6$ and $T_7$ are turned on momentarily during a calibration routine (to be described later) by the application of control pulses to their gates as shown.

The use of low-leakage CMOS transistors allows the capacitor $C_c$ to have a low-value, typically 1pF. The capacitor $C_s$ also has a typical value of 1pF.

Each photodiode comprising the array is connected to a separate circuit of the form shown in the drawing and each output (line 3) is fed into the multiplexer. The circuits are incorporated in the array substrate.

In operation of the invention, firstly a correction routine is performed in order to set the value of the current $I_c$ for each read-out and correction circuit associated with each photodiode comprising the array. In order to do this a uniform temperature source is placed in front of the array. The temperature of this source should be within the range of the temperatures of the scene to be imaged and is preferably at the cool end of the scene. As an alternative to the use of a uniform temperature source, a defocused image of the scene may be used.

Next, the transistor $T_1$ is turned on for the order of 1 $\mu$s by the application of a control pulse to its gate during which time the capacitor $C_s$ charges to a reset voltage of value $V_{RS}$. At the same time, $T_7$ is turned on by means of a control pulse applied to its gate so that any residual voltage on the capacitor $C_c$ may be discharged.

For the next stage of the calibration routine, the preamplifier 2 and the transistors $T_4$ and $T_6$ are turned on for a few milliseconds. This procedure allows the voltage across the capacitor $C_s$ to fall as current flows from the capacitor $C_s$ into the preamplifier 2 and photodiode 1 in response to photons incident on the photodiode 1 from the uniform source. This current is the background pedestal signal and leakage signal.

At the same time, the voltage across the capacitor $C_c$ automatically tracks the voltage across the capacitor $C_s$ until the current $I_c$ through the transistor $T_3$ is equal to the current flowing through the preamplifier 2 and photodiode 1. Once this condition has been achieved the preamplifier 2 and the transistors $T_4$ and $T_6$ are turned off and the uniform temperature source is removed. Thus an isolated voltage is left on the capacitor $C_c$ which can maintain the current $I_c$ at its previously set value.

The array may now be operated in its normal sensing mode with the capacitor $C_s$ recharged to the voltage level $V_{RS}$ by turning on $T_1$ momentarily and then with the preamplifier 2 and the transistor $T_6$ turned on for an appropriate integration time. The current $I_c$ continues to flow during the integration period so that $I_c$ is subtracted from the preamplifier 2 and photodiode 1 signal current. Thus the current ($I_c$) equivalent to a background pedestal and leakage signal is removed and the capacitor $C_s$ stores only the wanted signal from the photodiode. This residual voltage on the capacitor $C_s$ is sensed by the transistor $T_2$ and transferred to the multiplexer.

Eventually, the charge on capacitor $C_c$ will leak away through the transistors, in which case the calibration procedure is repeated in order to restore $I_c$.

In an alternative embodiment, the transistor $T_6$ is omitted.

We claim:

1. A read-out circuit for a photodetector (1), the circuit including:
    correcting means ($C_c$, $T_3$ to $T_7$) for deriving a correction signal from the photodetector output during a calibration phase; and
    integrating means ($C_s$, $T_1$) for concurrently receiving a measurement phase signal derived from the photodetector output and said correction signal during a measurement phase, and for integrating any difference between said measurement phase signal and said correction signal.

2. A read-out circuit according to claim 1 wherein said integrating means includes a storage capacitor ($C_s$) chargeable to a present voltage, and said photodetector (1) output and said correction signal comprise currents in counterflow during the measurement phase and produce a net current difference signal for integrating by the storage capacitor ($C_s$).

3. A read-out circuit according to claim 2 wherein said correcting means ($C_c$, $T_3$ to $T_7$ comprises a constant current circuit having an output current controlled by a bias voltage across a reference capacitor ($C_c$), the reference capacitor ($C_c$) being chargeable in response to the photodetector output during the calibration phase.

4. An array of photodetectors, each photodetector having a respective readout circuit, each circuit including:
    correcting means ($C_c$, $T_3$ to $T_7$) for deriving a respective correction signal from its associated photodetector output during a calibration phase; and
    integrating means ($C_s$, $T_1$) for concurrently receiving a measurement phase signal derived from the associated photodetector output and said respective correction signal during a measurement phase, and for integrating any difference between said measurement phase signal and said correction signal for each photodetector.

5. An array of photodetectors according to claim 4 wherein each integrating means includes a storage capacitor ($C_s$) chargeable to a present voltage, and each photodetector output and respective correction signal comprise counterflowing signal currents during measurement phase and produce a net current difference signal for integration by the respective storage capacitor ($C_s$).

6. An array of photodetectors according to claim 4 wherein said respective read-out circuits are integrated in a common substrate of semiconductor material.

7. An array of photodetectors according to claim 4, further including means for exposing the photodetectors to one of a defocussed scene image, a diffused scene image, and a substantially uniform source, during the calibration phase.

8. In a read-out circuit for a photodetector, the circuit including correcting means arranged to derive a correction signal from the photodetector output during a calibration phase, and integrating means arranged to receive a measurement phase signal derived from the photodetector output during a measurement phase, the improvement comprising the integrating means is arranged to receive the measurement phase signal and the correction signal concurrently during the measurement phase and to integrate their difference.

9. A read-out circuit according to claim 8 wherein the integrating means includes a storage capacitor chargeable to a present voltage, and the photodetector and the correcting means are arranged to give rise to respective signal currents in counterflow during the measurement phase to produce a net current difference signal for integrating by the storage capacitor.

10. A read-out circuit according to claim 9 wherein the correcting means is a constant current circuit having an output current controlled by a bias voltage across a reference capacitor, the reference capacitor being chargeable in response to the photodetector output during the calibration phase.

11. In an array of photodetectors each having a respective read-out circuit, each circuit including correcting means arranged to derive a respective correction signal from its associated photodetector output during a calibration phase and integrating means arranged to receive a measurement phase signal derived from the associated photodetector output during a measurement phase, the improvement comprising each integrating means is arranged to receive the respective measurement phase signal and correction signal concurrently during the measurement phase and to integrate their difference.

12. An array of photodetectors according to claim 11 wherein each integrating means includes a storage capacitor chargeable to a preset voltage, and the respective photodetector and correcting means in each circuit are arranged in combination to give rise to counterflowing signal currents during measurement phase to produce a net current difference signal for integration by the respective storage capacitor.

13. An array of photodetectors according to claim 12 wherein the read-out circuits are integrated in a common substrate of semiconductor material.

14. An array of photodetectors according to claim 12 including means for exposing the photodetectors in each circuit to any one of a defocussed scene image, a diffused scene image and a substantially uniform source during calibration phase.

* * * * *